United States Patent
Gulker et al.

(10) Patent No.: US 7,530,625 B2
(45) Date of Patent: May 12, 2009

(54) EXTERIOR MIRROR SAIL AIR FLOW SPOILER

(75) Inventors: Bill Gulker, Beverly Hills, MI (US); Terry Sullivan, Novi, MI (US); Debra Karen Yale, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/752,387

(22) Filed: May 23, 2007

(65) Prior Publication Data

US 2008/0290690 A1 Nov. 27, 2008

(51) Int. Cl.
*B62D 35/00* (2006.01)
*B60J 1/20* (2006.01)

(52) U.S. Cl. ................... 296/180.1; 296/1.11
(58) Field of Classification Search .............. 296/180.1, 296/1.07, 1.11, 146.1, 152, 1.03, 154; 359/549; 248/466, 476, 477, 489
See application file for complete search history.

(56) References Cited

U.S. PATENT DOCUMENTS

| | | | |
|---|---|---|---|
| 4,538,851 A * | 9/1985 | Taylor | 296/180.1 |
| 5,150,941 A * | 9/1992 | Silzer et al. | 296/152 |
| 5,899,520 A * | 5/1999 | Bryant | 296/152 |
| 6,089,723 A | 7/2000 | Ogasawara et al. | |
| 6,419,300 B1 | 7/2002 | Pavao et al. | |
| 6,481,863 B2 | 11/2002 | Horio et al. | |
| 6,595,576 B2 | 7/2003 | Mizutani et al. | |
| 6,712,413 B1 * | 3/2004 | Flowerday | 296/1.11 |
| 7,025,920 B2 | 4/2006 | Pavao et al. | |
| 7,070,288 B2 | 7/2006 | Mizutani et al. | |
| 7,192,078 B2 * | 3/2007 | Buley et al. | 296/180.1 |
| 7,318,619 B2 * | 1/2008 | Munro et al. | 296/180.1 |

FOREIGN PATENT DOCUMENTS

| | | |
|---|---|---|
| EP | 0353475 | 2/1990 |
| JP | 7132775 | 5/1995 |
| JP | 8310302 | 11/1996 |
| JP | 11078695 | 3/1999 |
| JP | 2000142493 | 5/2000 |
| WO | WO03010584 | 2/2003 |

* cited by examiner

*Primary Examiner*—Glenn Dayoan
*Assistant Examiner*—Gregory Blankenship
(74) *Attorney, Agent, or Firm*—Gregory P. Brown; Price, Heneveld, Cooper, DeWitt & Litton LLP

(57) ABSTRACT

A side view mirror assembly for minimizing noise generated during movement of a vehicle having the assembly mounted thereto. The assembly includes a sail mountable to the vehicle, an arm mounted to or formed with the sail, and a mirror mountable to the arm. The sail may include a spoiler having a generally triangular cross-section for deflecting air flow away from the vehicle and thereby minimizing noise generated during movement of the vehicle.

18 Claims, 4 Drawing Sheets

EXTERIOR MIRROR SAIL AIR FLOW SPOILER

BACKGROUND OF INVENTION a. Field of Invention

The invention relates generally to vehicle structural design for noise control, and more particularly, to the structural design of vehicle side view mirrors and their adjacent components for minimizing wind generated noise.

b. Description of Related Art

As is known in the art, automobiles include a variety of interior and exterior structural components whose design is governed by a variety of performance factors, some of which are related to minimizing the noise within the occupant compartment. Such noise related performance factors themselves are limited in their application due to aesthetic considerations. For example, whereas an optimal shape of an automobile and its exterior structural components may be a rounded shape for minimizing wind related noise, a rounded shape may however be undesirable from an aesthetics viewpoint. Yet further, whereas a variety of structural components such as wind deflectors may be located at strategic locations adjacent key noise generating components such as side view mirrors, grills, bumpers etc., such structural components may likewise be undesirable from an aesthetics viewpoint.

In the art, for components such as side view mirrors, a variety of designs have been proposed for the mirror structure for minimizing wind related noise. U.S. Pat. No. 6,481,863 to Horio and U.S. Pat. No. 6,712,413 to Flowerday are exemplary of such side view mirror designs. While these designs aim to provide wind noise reduction, the use and effectiveness thereof is however limited due to the drawbacks discussed below.

For example, Horio, as illustrated in FIGS. 1 and 2 thereof, discloses a side view mirror (10) for which opposing portion (54) is exposed at the open end of connecting portion (40) toward the rear of the vehicle, i.e., at the surface of visor (16) near connecting portion (40) toward the rear of the vehicle. Therefore, even if irregularities are formed, they are formed at the end portion of connecting portion (40) toward the rear of the vehicle. Accordingly, the respective surfaces of connecting portion (40) toward the upward and downward directions of the vehicle are solely formed by the surface of connecting portion (40). As a result, as per the discussion n Horio, smooth surfaces having no irregularities or extremely small and little irregularities are formed, whereby noise such as wind noise generated near connecting portion (40) can be reduced or eliminated.

While Horio targets connecting portion (40) for wind related noise reduction, Horio however does not address noise due to the components adjacent the mirror, such as the mirror itself or its sail.

In this regard, Flowerday, as illustrated in FIGS. 1, 2 and 4 thereof, discloses a mirror assembly (10) including a mirror flag (16) connected to an external shell (14) for attachment to an external surface of a vehicle. The mirror flag includes a spoiler (56) extending between a mounting bracket and arm (48) for redirecting air flow away from shell (14) and recess (20), thereby reducing wind noise. As illustrated in FIG. 4, spoiler (56) is generally in the form of a curved plate for redirecting air flow away from shell (14) and recess (20).

While the implementation of spoiler (56) provides wind related noise reduction per the disclosure of Flowerday, spoiler (56) is however undesirable from a manufacturing, use and aesthetics standpoint. For example, from a manufacturing standpoint, spoiler (56) must be installed onto arm (48) and is readily susceptible to breakage during the manufacturing process or during routine vehicle use, and further, spoiler (56) requires special considerations for painting thereof, thus being cost a prohibitive option. From an aesthetics viewpoint, spoiler (56) obtrusively protrudes from arm (48) and is therefore an undesirable addition to the overall uniform structure desirable in a vehicle.

It is therefore desirable to provide a vehicle side view mirror and adjacent component design for minimizing wind related noise, without the design being obtrusive from manufacturing or aesthetics standpoints. It is also desirable to provide a vehicle side view mirror and adjacent component design which does not require special manufacturing considerations and is not therefore cost prohibitive.

SUMMARY OF THE INVENTION

The invention solves the problems and overcomes the drawbacks and deficiencies of prior art vehicle side view mirror designs by providing a side view mirror assembly for minimizing noise generated during movement of a vehicle having the assembly mounted thereto. The assembly may include a sail mounted to the vehicle, an arm mounted to or formed with the sail, and a mirror mounted to the arm. The sail may include a spoiler having a generally triangular cross-section for deflecting air flow away from the vehicle and thereby minimizing noise generated during movement of the vehicle.

For the side view mirror assembly described above, the spoiler may include a first surface disposed at an obtuse angle relative to an outer surface of the sail and a second surface disposed at an acute angle relative to the outer surface of the sail. In a particular embodiment, the spoiler may include the first surface disposed between a range of approximately 117°-145° relative to an outer surface of the sail and the second surface disposed between a range of approximately 1°-90° relative to the outer surface of the sail. Further, in an exemplary embodiment, the spoiler may include the first surface disposed at approximately 144° relative to an outer surface of the sail and the second surface disposed at approximately 46° relative to the outer surface of the sail. Yet further, in particular embodiments, the first and second surfaces may be connected to each other at a generally sharp edge, or alternatively, the first and second surfaces may be connected to each other at a generally rounded edge.

The invention also provides a vehicle including a side view mirror assembly for minimizing noise generated during movement of the vehicle. The vehicle may include a sail mounted to the vehicle, an arm mounted to or formed with the sail, and a mirror mounted to the arm. The sail may include a spoiler having a generally triangular cross-section for deflecting air flow away from the vehicle and thereby minimizing noise generated during movement of the vehicle.

For the vehicle described above, the spoiler may include a first surface disposed at an obtuse angle relative to an outer surface of the sail and a second surface disposed at an acute angle relative to the outer surface of the sail. In a particular embodiment, the spoiler may include the first surface disposed between a range of approximately 117°-145° relative to an outer surface of the sail and the second surface disposed between a range of approximately 1°-90° relative to the outer surface of the sail. Further, in an exemplary embodiment, the spoiler may include the first surface disposed at approximately 144° relative to an outer surface of the sail and the second surface disposed at approximately 46° relative to the outer surface of the sail. Yet further, in particular embodiments, the first and second surfaces may be connected to each other at a generally sharp edge, or alternatively, the first and second surfaces may be connected to each other at a generally rounded edge.

The invention yet further provides a side view mirror assembly for minimizing noise generated during movement of a vehicle having the assembly mounted thereto. The assembly may include a sail mountable to the vehicle, an arm mounted to or formed with the sail, and a mirror mountable to the arm. The sail may include a spoiler having a generally triangular cross-section for deflecting air flow away from the vehicle and thereby minimizing noise generated during movement of the vehicle.

For the side view mirror assembly described above, the spoiler may include a first surface disposed at an obtuse angle relative to an outer surface of the sail and a second surface disposed at an acute angle relative to the outer surface of the sail. In a particular embodiment, the spoiler may include the first surface disposed between a range of approximately 117°-145° relative to an outer surface of the sail and the second surface disposed between a range of approximately 1°-90° relative to the outer surface of the sail. Further, in an exemplary embodiment, the spoiler may include the first surface disposed at approximately 144° relative to an outer surface of the sail and the second surface disposed at approximately 46° relative to the outer surface of the sail. Yet further, in particular embodiments, the first and second surfaces may be connected to each other at a generally sharp edge, or alternatively, the first and second surfaces may be connected to each other at a generally rounded edge.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 2:
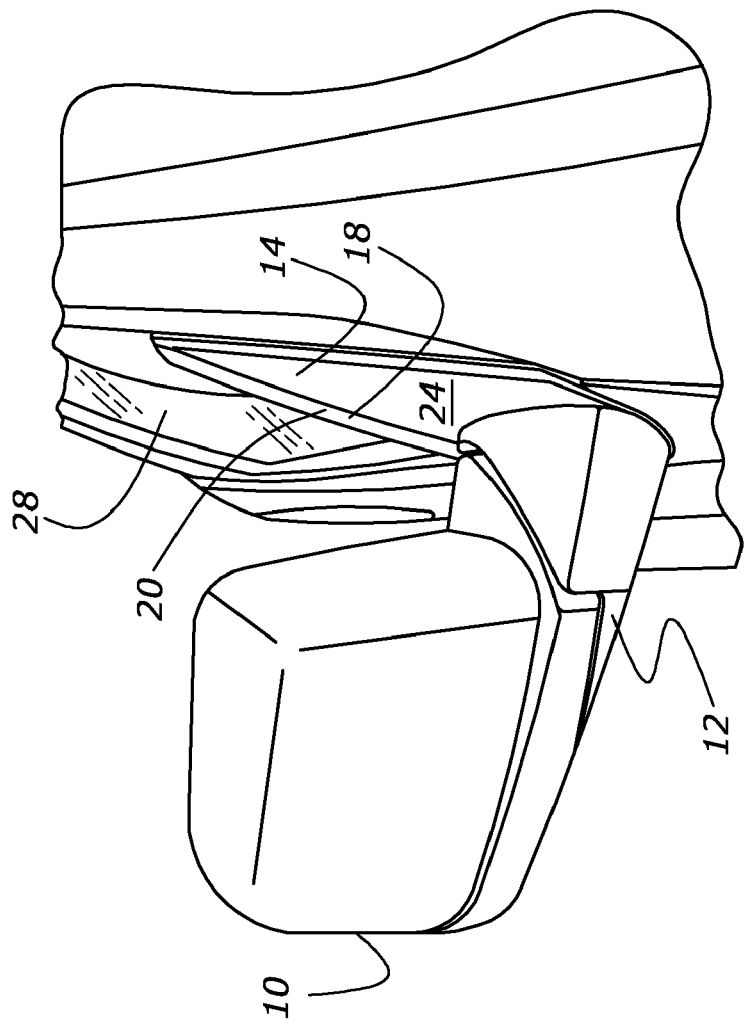
FIGS. 2-4 are isometric views of a side view mirror including the spoiler of FIG. 1, illustrating the spoiler from various angles.
Figure 1:
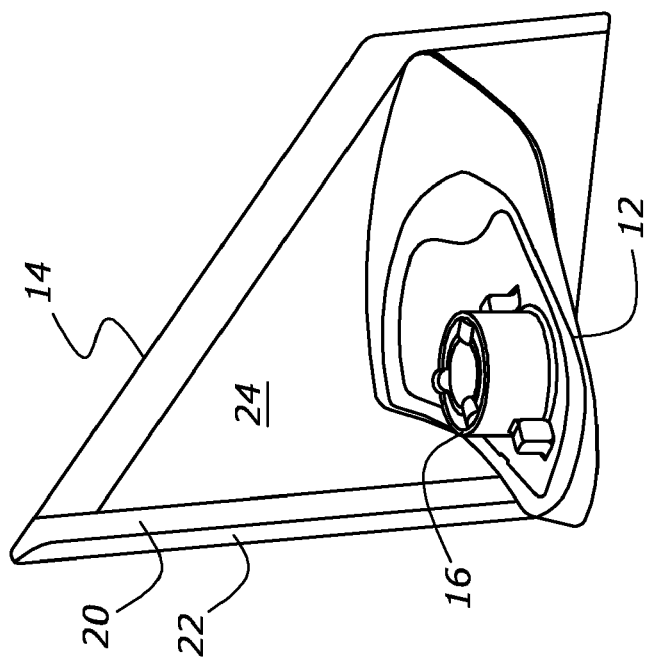
FIG. 1 is an isometric view of a sail including a spoiler according to the present invention, and a mounting bracket for a vehicle side view mirror.

Referring now to the drawings wherein like reference numerals designate corresponding parts throughout the several views, FIGS. 1-6 illustrate various views of a side view mirror including a spoiler (generally designated "air flow spoiler") according to the present invention.

Referring to FIGS. 1-5, the invention may generally include a side view mirror 10 mountable to a vehicle (not shown) by arm 12 which is itself mounted to sail 14 attached to the vehicle. Arm 12 may include pivot connection 16 for enabling mirror 10 to rotate toward the front or rear of the vehicle in a known manner. Sail 14 may include an air flow spoiler 18 having a generally triangular cross-section at its exposed area for deflecting flow of wind during movement of the vehicle. As shown in FIGS. 1-5, air flow spoiler 18 may include first and second surfaces 20, 22, disposed at predetermined angles relative to exposed surface 24 thereof. Second surface 22 may terminate as shown relative to third surface 26 or be tapered or otherwise terminated in another manner, as would be evident to those skilled in the art. Third surface 26 may terminate against window 28 or the vehicle door frame (not shown).

Figure 5:
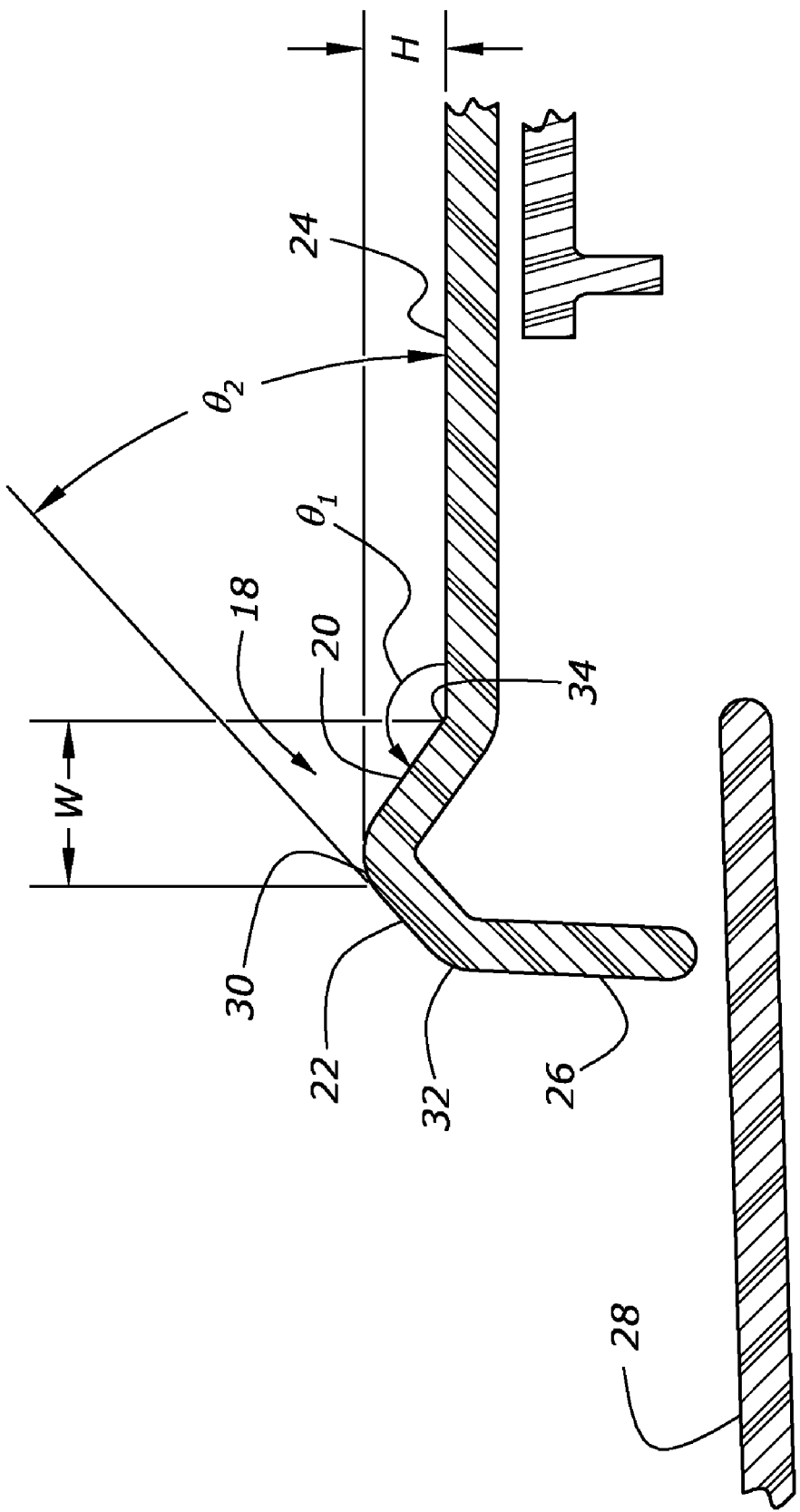
FIG. 5 is a cross-sectional view of the spoiler of FIGS. 1-4, taken generally across line 5-5 in FIG. 1.

Referring to FIG. 5, in order to deflect flow of wind away from the vehicle, the height H and width W of surface 20, relative to exposed surface 24 may be provided at a H/W ratio of approximately 2.0-0.7, with an exemplary height being 5.5 mm and width being 7.5 mm. For the noted exemplary height and width, the angle $\theta_1$ formed between surfaces 24, 20 equates to approximately 144° and the angle $\theta_2$ between surfaces 24, 22 equates to approximately 46°. For the H/W ratio range of 2.0-0.7, the angle $\theta_1$ range between surfaces 24, 20 equates to approximately 117°-145°, and for the angle between surfaces 24, 22, the angle $\theta_2$ range may be any suitable range from approximately 1°-90°.

Referring again to FIG. 5, edges 30, 32 and area 34 may be rounded as shown or formed sharp based on air flow performance as well as aesthetic considerations.

Figure 3:
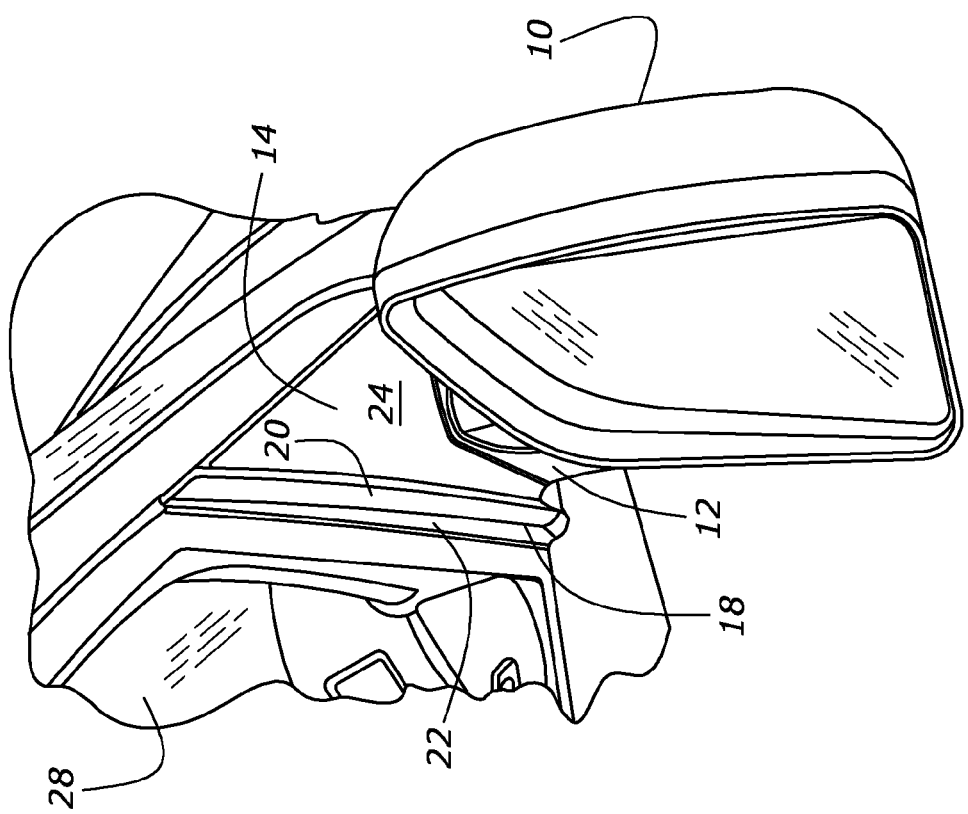
Figure 4:
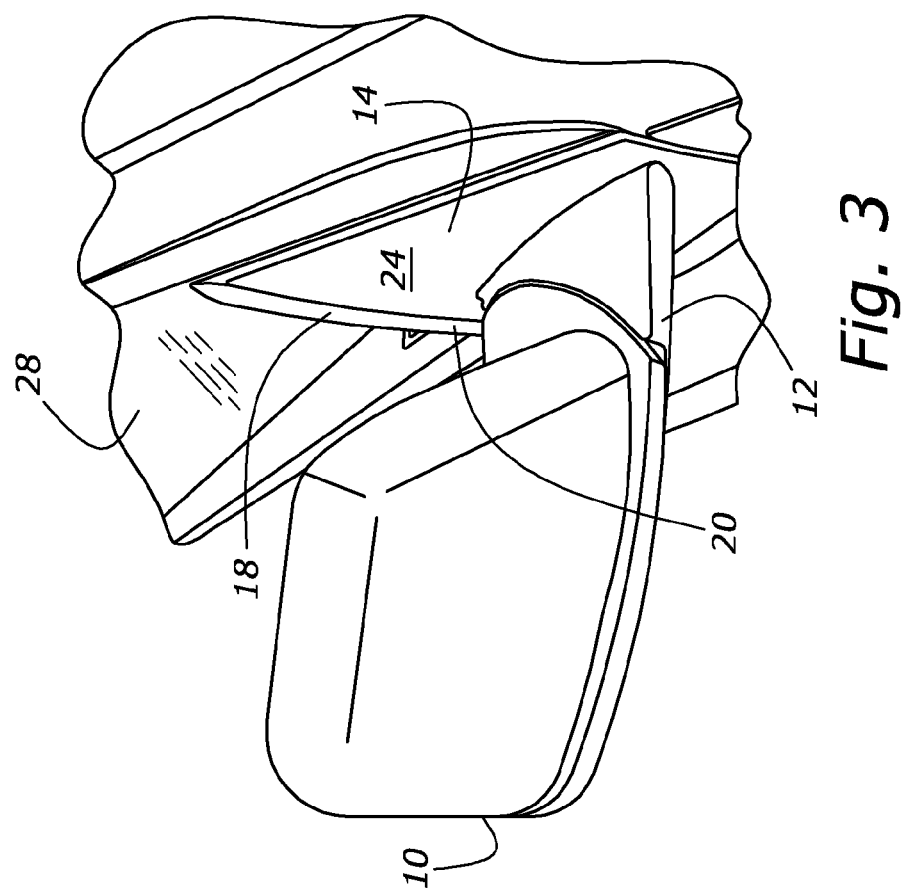
Figure 6:
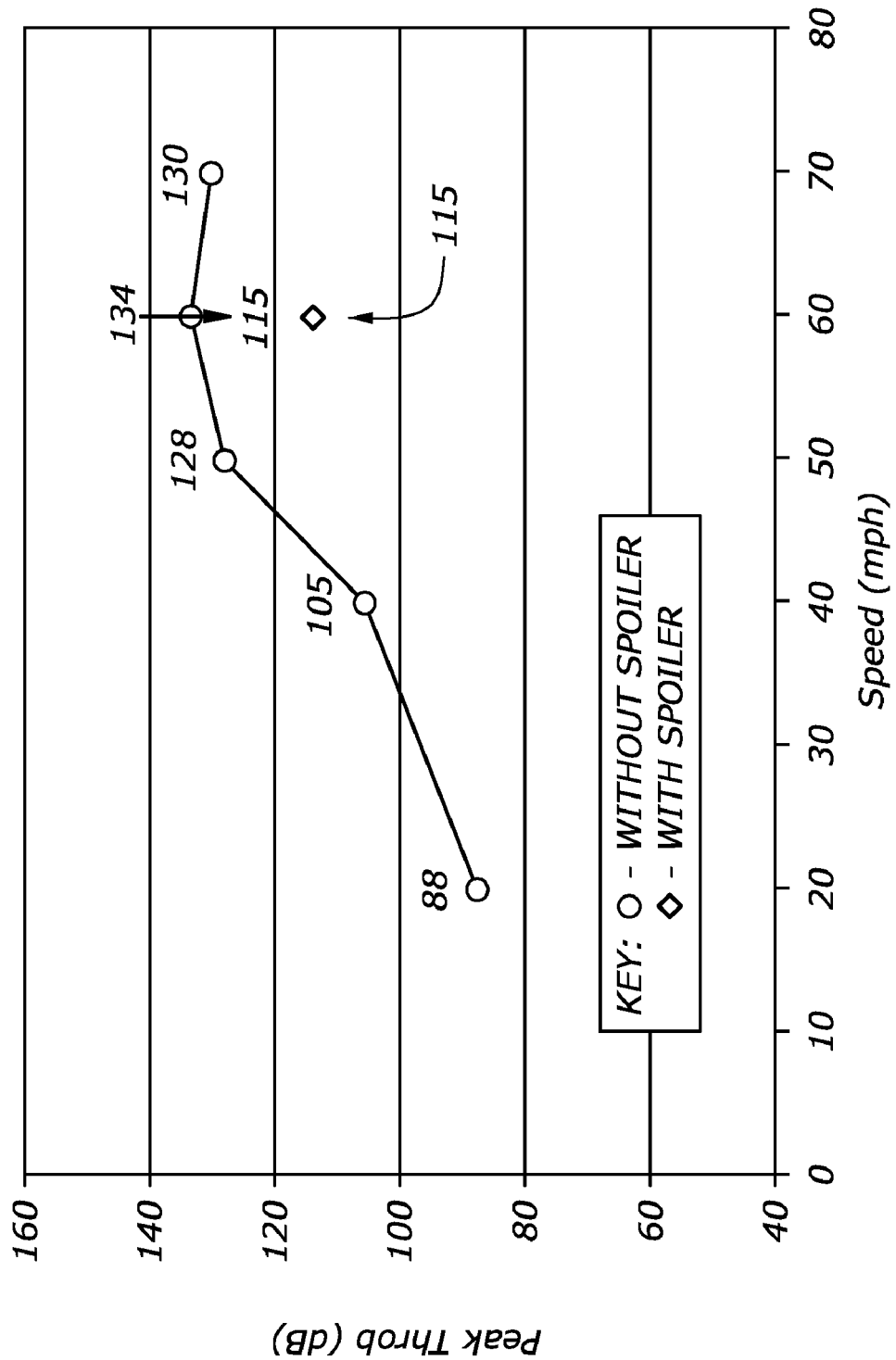
FIG. 6 is graph of wind generated throbbing noise in two exemplary vehicles, one without and one with the spoiler of FIGS. 1-5.

Referring next to FIG. 6, a graph of wind generated throbbing noise in two exemplary vehicles, one without and one with air flow spoiler 18 of FIGS. 2-4 is illustrated. As shown in FIG. 6, for the exemplary vehicle without air flow spoiler 18 provided on sail 14, at approximately 60 mph, peak throbbing noise is measured at approximately 134 dB. With the vehicle provided with air flow spoiler 18 on sail 14, at approximately 60 mph, peak throbbing noise is reduced to approximately 115 dB (i.e. by 19 dB).

To summarize, based on the discussion above, the present invention thus provides a vehicle side view mirror and adjacent component design for sail 14 and its associated air flow spoiler 18 for minimizing wind related noise, without the design being obtrusive from manufacturing or aesthetics standpoints. In this regard, because of the generally triangular cross-section, air flow spoiler 18 may be readily manufactured with sail 14 as a one piece component. The invention also provides a vehicle side view mirror and adjacent component design which does not require special manufacturing considerations and is not therefore cost prohibitive. In this regard, because of the option for single-step manufacturing for sail 14 and air flow spoiler 18, and further, because of the smooth transition between sail 14 and air flow spoiler 18 at edges 30, 32 and area 34, the addition of spoiler 18 does not require any special manufacturing considerations, for example, with regard to painting of the sail and spoiler surfaces.

Those skilled in the art would readily appreciate in view of this disclosure that various modifications could be made to sail 14 and its associated air flow spoiler 18 described above, without departing from the scope of the present invention. For example, whereas the angle ranges between surfaces 24, 20 and 24, 22 have been indicated as approximately 117°-145° and approximately 1°-90°, those skilled in the art would appreciate that deviations may be made from these ranges so long as surfaces 20, 22 include a generally triangular cross-section as illustrated in FIG. 5. Yet further, whereas air flow spoiler 18 is indicated as being provided on sail 14, spoiler 18 may be readily provided on other surfaces of the vehicle (i.e. adjacent headlights, the vehicle A-D pillars, sunroof openings etc.).

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A side view mirror assembly for minimizing noise generated during movement of a vehicle having said assembly mounted thereto, said assembly comprising:
a sail mounted to the vehicle;
an arm mounted to or formed with said sail; and
a mirror mounted to said arm,
wherein said sail includes a spoiler protruding therefrom having a generally triangular cross-section for deflecting air flow away from the vehicle and thereby minimizing noise generated during movement of the vehicle, said spoiler being disposed a predetermined distance away from said mirror to provide a substantial gap between said spoiler and said mirror.

2. A side view mirror assembly according to claim 1, wherein said spoiler includes a first surface disposed at an obtuse angle relative to an outer surface of said sail and a second surface disposed at an acute angle relative to said outer surface of said sail.

3. A side view mirror assembly according to claim 1, wherein said spoiler includes a first surface disposed between a range of approximately 117°-145° relative to an outer surface of said sail and a second surface disposed between a range of approximately 1°-90° relative to said outer surface of said sail.

4. A side view mirror assembly according to claim 1, wherein said spoiler includes a first surface disposed at approximately 144° relative to an outer surface of said sail and a second surface disposed at approximately 46° relative to said outer surface of said sail.

5. A side view mirror assembly according to claim 2, wherein said first and second surfaces are connected to each other at a generally sharp edge.

6. A side view mirror assembly according to claim 2, wherein said first and second surfaces are connected to each other at a generally rounded edge.

7. A vehicle including a side view mirror assembly for minimizing noise generated during movement of the vehicle, said vehicle comprising:
a sail mounted to said vehicle;
an arm mounted to or formed with said sail; and
a mirror mounted to said arm,
wherein said sail includes a spoiler having a generally triangular cross-section for deflecting air flow away from said vehicle and thereby minimizing noise generated during movement of said vehicle, said spoiler being disposed a predetermined distance away from said mirror to provide a gap between said spoiler and said mirror.

8. A vehicle according to claim 7, wherein said spoiler includes a first surface disposed at an obtuse angle relative to an outer surface of said sail and a second surface disposed at an acute angle relative to said outer surface of said sail.

9. A vehicle according to claim 7, wherein said spoiler includes a first surface disposed between a range of approximately 117°-145° relative to an outer surface of said sail and a second surface disposed between a range of approximately 1°-90° relative to said outer surface of said sail.

10. A vehicle according to claim 7, wherein said spoiler includes a first surface disposed at approximately 144° relative to an outer surface of said sail and a second surface disposed at approximately 46° relative to said outer surface of said sail.

11. A vehicle according to claim 8, wherein said first and second surfaces are connected to each other at a generally sharp edge.

12. A vehicle according to claim 8, wherein said first and second surfaces are connected to each other at a generally rounded edge.

13. A side view mirror assembly for minimizing noise generated during movement of a vehicle having said assembly mounted thereto, said assembly comprising:
a sail mountable to the vehicle;
an arm mounted to or formed with said sail; and
a mirror mountable to said arm,
wherein said sail includes a spoiler having a generally triangular cross-section for deflecting air flow away from the vehicle and thereby minimizing noise generated during movement of the vehicle, said spoiler being disposed a predetermined distance away from the mirror to provide a gap between said spoiler and the mirror.

14. A side view mirror assembly according to claim 13, wherein said spoiler includes a first surface disposed at an obtuse angle relative to an outer surface of said sail and a second surface disposed at an acute angle relative to said outer surface of said sail.

15. A side view mirror assembly according to claim 13, wherein said spoiler includes a first surface disposed between a range of approximately 117°-145° relative to an outer surface of said sail and a second surface disposed between a range of approximately 1°-90° relative to said outer surface of said sail.

16. A side view mirror assembly according to claim 13, wherein said spoiler includes a first surface disposed at approximately 144° relative to an outer surface of said sail and a second surface disposed at approximately 44° relative to said outer surface of said sail.

17. A side view mirror assembly according to claim 14, wherein said first and second surfaces are connected to each other at a generally sharp edge.

18. A side view mirror assembly according to claim 14, wherein said first and second surfaces are connected to each other at a generally rounded edge.

* * * * *